W. J. FRANCKE.
TESTING MACHINE.
APPLICATION FILED JULY 10, 1918.

1,335,887.

Patented Apr. 6, 1920.
2 SHEETS—SHEET 1.

WITNESSES
Edw. Thorpe
Geo. J. Herster

INVENTOR
William J. Francke
BY
Munn & Co.
ATTORNEYS

W. J. FRANCKE.
TESTING MACHINE.
APPLICATION FILED JULY 10, 1918.

1,335,887.

Patented Apr. 6, 1920.
2 SHEETS—SHEET 2.

WITNESSES
Edw. Thorpe
Rev. J. Hoster

INVENTOR
William J. Francke
BY
ATTORNEYS

UNITED STATES PATENT OFFICE.

WILLIAM J. FRANCKE, OF HIGHLAND PARK, NEW JERSEY.

TESTING-MACHINE.

1,335,887.  Specification of Letters Patent.  Patented Apr. 6, 1920.

Application filed July 10, 1918. Serial No. 244,220.

*To all whom it may concern:*

Be it known that I, WILLIAM J. FRANCKE, a citizen of the United States, and a resident of Highland Park, in the county of Middlesex and State of New Jersey, have invented a new and Improved Testing-Machine, of which the following is a full, clear, and exact description.

The object of the invention is to provide a new and improved testing machine more especially designed for testing the quality of metals by determining the deformation that takes place in their crystalline structure while under flexure strain by measuring the deflection. Another object is to enable the operator to obtain minute, accurate readings during the testing operations. Another object is to cause the deflection, which is normally slow, to take place rapidly so that readings may be taken when the deflection is complete thus eliminating the errors in readings which are caused by the influence of elastic after effect.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1:
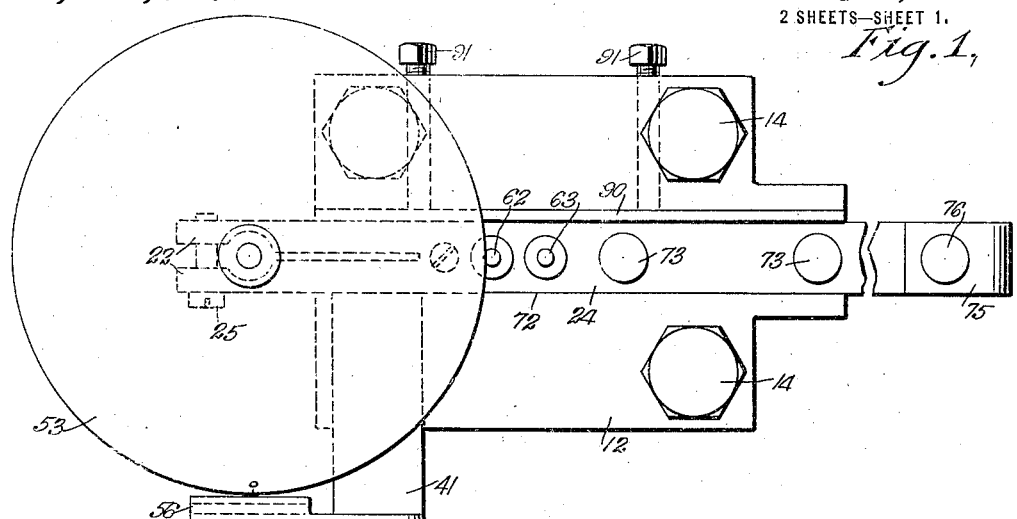
Figure 1 is a plan view of the testing machine.

The testing machine is mounted on a suitable post or standard 10 terminating at its upper end in a jaw 11 between which and the jaw 12 is held the piece 13 to be tested, it being understood that a portion of the said test piece 13 projects beyond one side of the jaws 11 and 12 for application of the testing devices. The jaw 12 is fastened to the jaw 11 by suitable bolts 14 to securely hold the article 13 clamped between the jaws during the testing operation. On the projecting portion of the article 13 to be tested is hung a bridle 15 engaged by a hook 16 on the upper end of a rod 17 provided with a holder 18 adapted to support superimposed weights 19, it being understood that the parts mentioned form a pressure device to flex in a downward direction the projecting end of the test piece 13 to be tested.

In order to read the amount of flexure after a weight 19 is placed on the holder, use is made of a micrometer 20 having a graduated post 21 clamped between two jaws 22 of an insulating material and held in the split or forked end 23 of a supporting bar 24. A clamping screw 25 engages the members of the split end 23 to firmly engage the jaws 22 with the micrometer post 21 to firmly support the micrometer on the supporting bar 24. The micrometer 20 is provided with the usual barrel 26 from which depends integrally the contacting stem 27 moving up or down with the barrel 26 on turning the latter to the right or to the left. The stem 27 is magnetized and engages a movable member 30 of an electric switch 31 having a frame 32 provided with an eye 33 engaging the free end of the article 13 to be tested, the eye having a screw 34 for securely fastening the frame 32 in place on the member 13 to be tested. The movable member 30 of the switch 31 is made of steel and one end thereof is held between blocks 35 of insulating material and attached to one end of the frame 32. The free end of the movable member 30 normally engages a contact 36 in the form of a screw screwing in the outer end of the frame 32. The movable member 30 adjacent the blocks 35 is made very thin thus forming a spring hinge to allow the member to readily swing up and down. The member 30 is however sufficiently stiff to normally extend horizontally so that the contact screw 36 may be adjusted to make a light, sensitive contact with the member 30. It will be noticed that the micrometer stem 27 on account of being magnetized causes the member 30 to move with it on turning the barrel 26 so that the movable member 30 eventually makes contact with the contact 36 to close the electric circuit for the electric lamp 40 held insulated on a suitable bracket 41 attached to the supporting bar 24. When the member 13 is flexed downward by an additional weight then the frame 32 and the switch 31 move with it. The post 21 and the barrel 26 of the micrometer 20 are provided with the usual graduations 50 and 51 for reading the movement of the barrel 26 by one-thousandths of an inch, and with the barrel 26 rotates a shaft 52 provided with a disk 53 having a graduation 54 on its peripheral edge, the markings of which are in .0001 and are adapted to be read on a vernier 55 formed on a plate of glass 56 attached to the support 41 previously mentioned. By the arrangement described the operator can obtain readings to one hundred thousandths of an inch. The graduation marks of the vernier 55 extend vertically to permit accurate reading on the up and down movement of the disk 53.

The circuit wires 60 and 61 of the electric lamp 40 connect with binding posts 62, 63 held insulated on the support for the micrometer 20. On the binding post 62 is secured a contact rod 64 engaging one side of the post 52 to electrically connect the latter with the said binding post but to allow up and down adjustment of the post in the jaw 22 as previously explained. The circuit wire 60 after leaving the binding post 62 contains a condenser 65 and then connects with a binding post 66 attached to the lower clamping jaw 11. The circuit wire 61 after leaving the binding post 63 connects with a battery or other suitable source of electrical energy 67 and then leads to a binding post 68 attached to the jaw 11. By the arrangement described, the electric current from the source of electrical energy 67 passes by way of the circuit wire 61, binding post 63, lamp 40, circuit wire 60, binding post 62, rod 64 and micrometer 20 to the movable member 30 of the electric switch 31 from which the current passes by way of the article 13 to be tested, to the jaw 11 and to the binding post 68 connected with the source of electrical energy 67. It is understood that the condenser 65 is used to store up static energy to prevent sparking at the contact members 30 and 36. The micrometer 20 is preferably a permanent magnet to cause the contact member 30 to move with the stem 27 of the micrometer.

Figure 2:
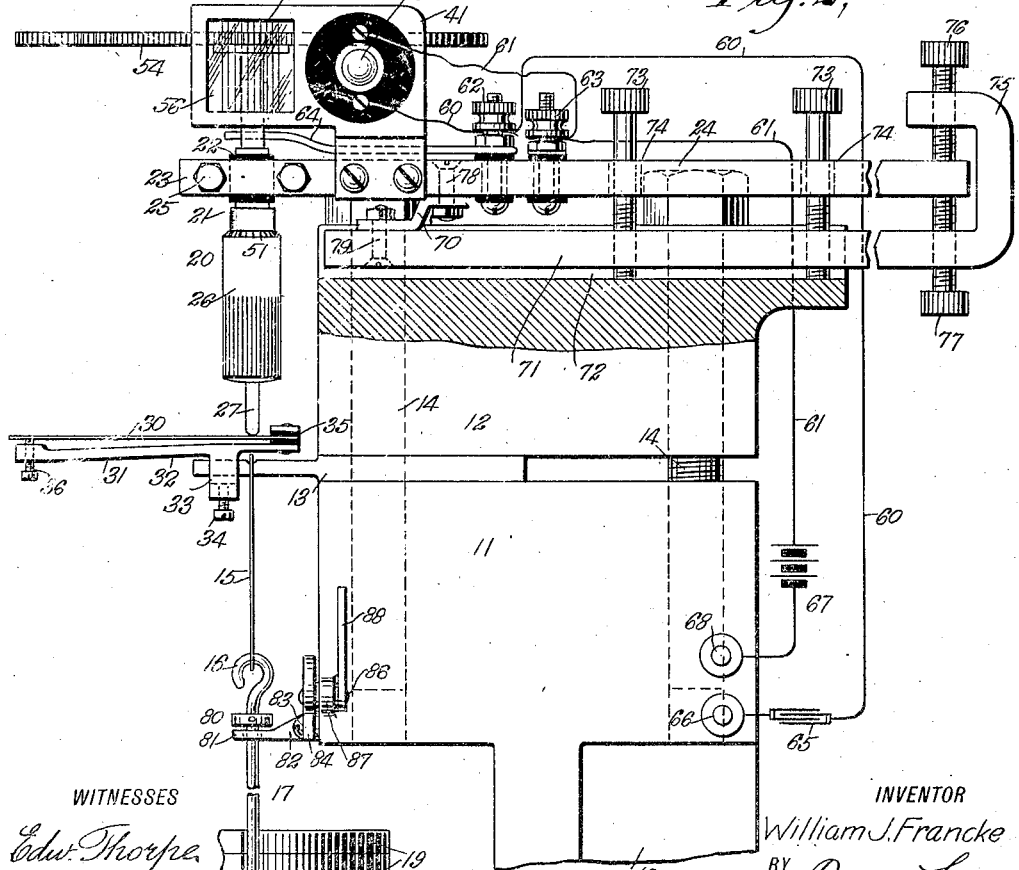
Fig. 2 is a front elevation of the same with a portion of the upper clamping jaw shown partly in section.
Figure 3:
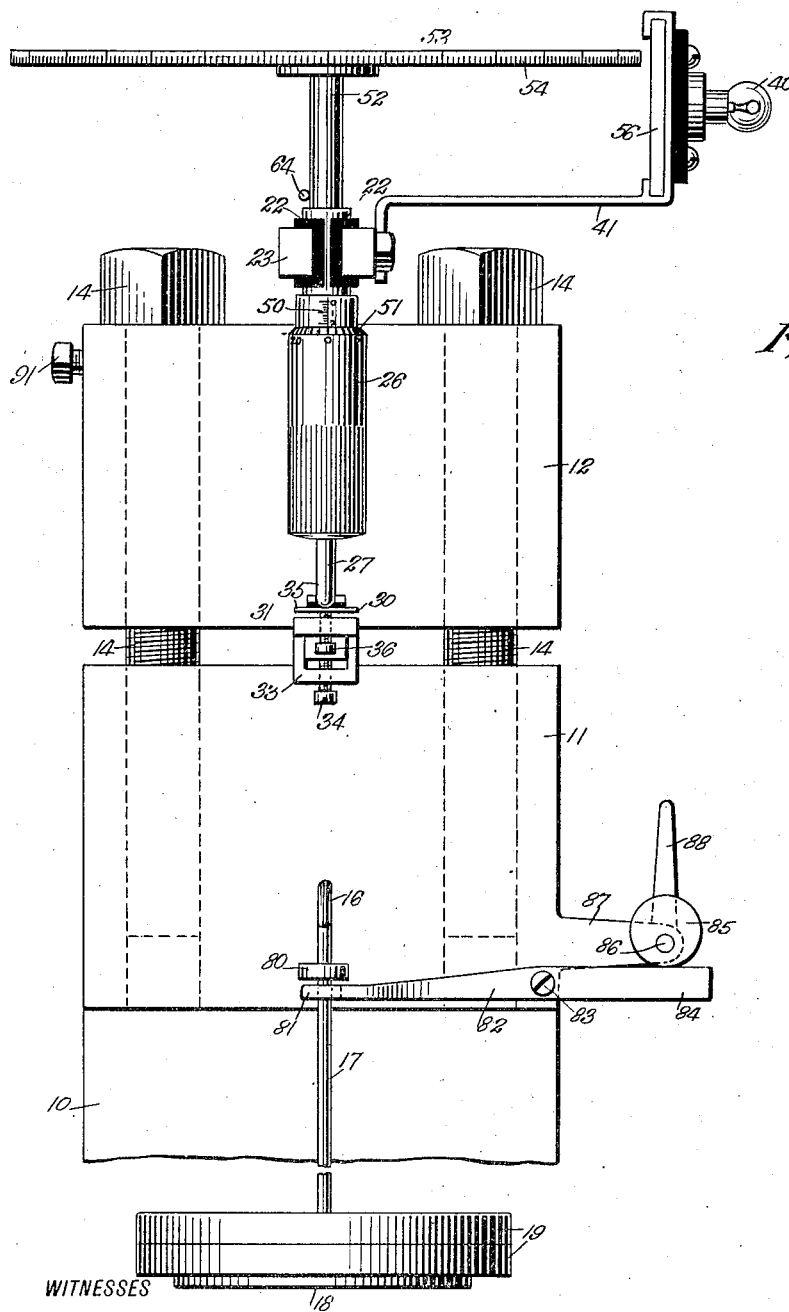
Fig. 3 is an enlarged side elevation of the same.

The supporting bar 24 for the micrometer 20 is connected by a fulcrum 70 with a base 71 fitted into a recess 72 formed on the top of the upper jaw 12. The base 71 is provided with adjusting screws 73 which rest on the bottom of the recess 72 and by the use of the adjusting screws 73 the base may be raised or lowered and with it the supporting bar 24 and the micrometer 20. The adjusting screws 73 extend loosely through openings 74 formed in the support 24. The right-hand side of the base 71 is provided with a return bend 75 in which screw screws 76 and 77 engaging the top and bottom of the support 24 to permit of imparting a swinging movement to the said supporting bar 24 with a view to adjust the stem and the micrometer 20. The fulcrum 70 is made of lead or other non-elastic material and is approximately Z-shaped with the ends attached by bolts 78, 79 to the supporting bar 24 and the base 71, respectively, as plainly shown in Fig. 2. It will be noticed that by the arrangement described, the connections between the base 71, the support 24 and the micrometer 20 are all rigid to eliminate inaccuracies or errors due to lost motion incident to using movable parts. By reference to Figs. 1 and 2, it will be noticed that the inelastic fulcrum 70 is located near the micrometer 20 and is remote from the adjusting screws 76 and 77 to permit of making a minute adjustment of the supporting bar 24 by the use of the screws 76 and 77. It is understood that by the arrangement described, a quick adjustment of the micrometer can be had by raising or lowering the entire support in the recess 72 of the upper jaw 12 and after the adjustment has been made the base 71 is securely fastened in place in the jaw 12 by a gib 90 interposed between the base 71 and the rear wall of the recess 72, the gib 90 being engaged by set screws 91, screwing in the said rear wall of the upper jaw 12, as shown in Fig. 1.

The purpose of testing a piece of steel, iron or other material is to measure the deflection for each weight increment. The operation of making a test consists of taking a reading for deflection for each added weight increment and plotting a curve from the readings. It is well known that the piece while undergoing the test is subjected to a deflection, the first or major portion of which is rapid while the last portion is slow, that is, extends through a longer period of time, the period varying according to the physical and chemical properties of the material. Accurate readings of the deflection cannot be obtained until the slow yielding has ceased and as this final yielding may take hours or days it is practically impossible to make an accurate test in a reasonable length of time. In order to permit of obtaining accurate readings quickly a number of intermittent stresses are made by the operator repeatedly removing and replacing the weights. This has a tendency to shorten the time required for the test piece to reach the maximum deflection for each weight. For this purpose the following arrangement is made: On the rod 17 of the weight support 18 is secured a collar 80 adapted to be engaged by the forked end 81 of a lever 82 fulcrumed at 83 on one side of the lower jaw 11. The end 84 of the lever 82 is engaged at the top by an eccentric 85 secured on a shaft 86 journaled in a bracket 87 attached or forming part of the lower jaw 11. On the shaft 86 is secured a handle 88 under the control of the operator for turning the shaft 86 to cause the eccentric 85 to impart a swinging motion to the lever 82. After a weight 19 has been placed in position on the pressure device the operator actuates the handle 88 a number of times to alternately raise and lower the weights, say about 50 to 100 times, to alternately lift and drop the weight relative to the article to overcome the elastic after effect after the application of a weight. The lever 82 is normally out of engagement with the collar 80 and this lifting and dropping device is held in inactive position during the time the micrometer 20 is adjusted and the result of the flexure is read as above explained.

The operation is as follows:

When the operator places a weight 19 in position then a deflection in the test piece is caused whereby the switch is carried down with it. The weight now exactly balances the strain in the test piece, any additional weight, even that caused by making an electrical contact, would cause a greater deflection than that due to the weight. To prevent this greater deflection due to making contact, the hinged member 30 is permanently adjusted so as to make just a light contact. The micrometer is now screwed down, and being a magnet it picks up the hinged member 30 thus preventing any additional weight or pressure of contact to affect the deflection caused by the weight. The micrometer is next screwed farther down thus letting the member 30 down until the latter makes contact with the contact screw 36 thereby closing the circuit and lighting the lamp 40. The reading is taken as soon as the contact is made, the making of the contact being signaled to the operator by the lighting of the lamp 40. After the reading is taken the micrometer is screwed up whereby the magnetized contact member 27 lifts the member 30 so that the break in the circuit takes place and the lamp is extinguished. It will be noticed that the circuit is broken at the contact point which is platinum and not at the point where the magnet picks up the member 30. As these points are made of steel the destructive effect of the break on the steel would destroy the accuracy of future readings. The weight 19 is now removed, the piece springs back and a reading is taken to determine if it has gone all the way back to determine the "permanent set." This operation is repeated for each weight, the weight being lifted on and off 50 to 100 times, as above described, before the micrometer is screwed down to take readings.

Having thus described my invention, I claim as new and desire to secure by Letters Patent:

1. In a testing machine, a micrometer support, a base, an inelastic fulcrum connecting the said micrometer with the said base, and adjusting means for imparting a swinging motion to the said micrometer support on said fulcrum.

2. In a testing machine, an electric circuit having a switch provided with a movable contact member and with means for holding it on the test piece, and a magnetic micrometer coacting with the said movable member to close the circuit without transmitting the weight or pressure of the contact member to the test piece.

3. In a testing machine, holding means for holding a test piece, a micrometer for measuring the deflection of the test piece, a support for the said micrometer and mounted on the said holding means, adjusting means for adjusting the said support on the holding means, and fastening means for fastening the support in place in the holding means after the adjustment of the support is made.

4. In a testing machine, holding means for holding the article to be tested, pressure means for subjecting the article to pressure, an electric signal, an electric circuit for the said signal and provided with a circuit closer mounted on the article to be tested and having a movable member, and a magnetic micrometer in the said circuit and adapted to engage the said movable member to normally hold the circuit open and to close the latter on the next adjustment of the micrometer.

5. In a testing machine, holding means for holding the article to be tested, a weight holder attached to the article, weights adapted to be placed successively onto the weight holder to gradually increase the pressure on the article, and means connected with the said weight holder to alternately raise and drop the weight holder a number of times after the addition of a weight to produce the full ultimate deflection for each load.

6. In a testing machine, an electric light circuit having a switch provided with a movable member for closing and breaking the circuit, the said switch having attaching means for attaching it to the article to be tested, a support, and a measuring instrument mounted on the said support and having a movable member engaging the said movable switch member to close the circuit on adjusting the said measuring instrument and to open the circuit on flexing the article to be tested.

7. In a testing machine, an electric light circuit having a switch provided with a movable member for closing and breaking the circuit, the said switch having attaching means for attaching it to the article to be tested, a support, and a micrometer mounted on the said support and having a movable magnetized member engaging the said movable switch member to cause the latter to move with the said movable micrometer member to close the circuit on adjusting the micrometer and to open the circuit on flexing the article to be tested.

8. In a testing machine, holding means for holding the article to be tested, a micrometer, a supporting bar on one end of which the micrometer is mounted, a base, a fulcrum of an inelastic material and connecting the said base with the said supporting bar, and adjusting screws screwing on the said base and engaging opposite faces of the said supporting bar to adjust the latter.

9. In a testing machine, an electric lamp, an electric circuit for the said lamp, a switch in the said circuit, the switch having an attaching member provided with means to attach it to the article to be tested, the switch having a fixed contact and an insulated movable contact member adapted to engage the said contact, a micrometer in the said circuit and having a magnetized movable member engaging the said contact member, and a support carrying the said micrometer and the said electric lamp.

10. In a testing machine, an electric lamp, an electric circuit for the said lamp, a switch in the said circuit, the switch having an attaching member provided with means to attach it to the article to be tested, the switch having a fixed contact and an insulated movable contact member adapted to engage the said contact, a micrometer in the said contact and having a magnetized movable member engaging the said contact member, a support carrying the said micrometer and the said electric lamp, a pair of jaws in which the article to be tested is clamped, the said support being mounted on one of the jaws, a weight holder adapted to engage the article to be tested, weights adapted to be placed on the said weight holder, and a manually controlled raising and lowering device mounted on one of the said jaws and engaging the said weight holder to raise or lower the latter.

WILLIAM J. FRANCKE.